US006850137B2

(12) United States Patent
Bird et al.

(10) Patent No.: US 6,850,137 B2
(45) Date of Patent: Feb. 1, 2005

(54) SUPERCONDUCTING LEVITATION MAGNET

(75) Inventors: Mark D. Bird, Tallahassee, FL (US); James Brooks, Tallahassee, FL (US); Yehia M. Eyssa, Tallahassee, FL (US)

(73) Assignee: FSU Research Foundation, Inc., Tallahassee, FL (US)

(*) Notice: Subject to any disclaimer, the term of this patent is extended or adjusted under 35 U.S.C. 154(b) by 0 days.

(21) Appl. No.: 10/680,569

(22) Filed: Oct. 7, 2003

(65) Prior Publication Data

US 2004/0113503 A1 Jun. 17, 2004

Related U.S. Application Data

(60) Provisional application No. 60/416,669, filed on Oct. 7, 2002.

(51) Int. Cl.[7] ................................. H01F 6/00
(52) U.S. Cl. ........................................ 335/216
(58) Field of Search ................. 335/216; 310/90.5

(56) References Cited

U.S. PATENT DOCUMENTS

| 5,332,987 A | * 7/1994 | Hennessy et al. ........... 335/216 |
| 5,521,570 A | 5/1996 | Ito et al. |
| 5,559,384 A | 9/1996 | Boland et al. |
| 5,831,362 A | 11/1998 | Chu et al. |
| 5,955,800 A | 9/1999 | Shearwood et al. |
| 6,735,848 B1 | * 5/2004 | Markiewicz et al. .......... 29/599 |

OTHER PUBLICATIONS

Berry et al., "Of Flying Frogs and Levitrons," Eur. J. Phys. 18, 1997, pp. 307–313, IOP Publishing Ltd & the European Physical Society, U.K.

Simon et al., "Diamagnetically Stabilized Magnet Levitation," Nov. 2000, M.D. Simon, University of California, Los Angeles and L.O. Heflinger, Los Angeles, 36 pages.

Simon et al., "Diamagnetic Levitation: Flying Frogs and Floating Magnets (invited)," Journal of Applied Physics, May 2000, pp. 6200–6204, vol. 87, No. 9, American Institute of Physics, U.S.A.

"Why Does the Frog Fly?," printed from http://www.sci.kun.nl/hfml/levitation–simp–expl.html on Sep. 24, 2001, Nijmegen–Amsterdam Magnet Laboratory, 1 page, The Netherlands.

(List continued on next page.)

Primary Examiner—Ramon M. Barrera
(74) Attorney, Agent, or Firm—Senniger Powers (57) ABSTRACT

A cost effective apparatus and method for levitating a diamagnetic material using a magnetic field produced by a superconducting magnet. Concentric superconducting coils produces magnetic fields when energized with current. The magnetic fields of the coils combine to produce an operational magnetic field for levitating the diamagnetic material inside a central bore.

22 Claims, 5 Drawing Sheets

OTHER PUBLICATIONS

"20 Tesla Bitter Magnet:," printed from http://www.sci.kun.nl/hfml/20t–magnet.html on Sep. 24, 2001, page last updated on Apr. 8, 1998, Nijmegen–Amsterdam Magnet Laboratory, 4 pages, The Netherlands.

"The Frog That Learned to Fly," printed from http://www.sci.kun.nl/hgml/froglev.html on Sep. 24, 2001, page last updated on Jul. 10, 2000, Nijmegen–Amsterdam Magnet Laboratory, 4 pages, The Netherlands.

Parker et al., "Levitating Magnet," printed from http://encarta.msn.com on Sep. 24, 2001, Microsoft Encarta Online Encyclopedia, Microsoft Corporation, 1 page, U.S.A.

Blume, "Magnetism," printed from http://encarta.msn.com on Sep. 24, 2001, Microsoft Encarta Online Encyclopedia, Microsoft Corporation, 9 pages, U.S.A.

"Titanium," printed from http://encarta.msn.com on Sep. 24, 2001, Microsoft Encarta Online Encyclopedia, Microsoft Corporation, 4 pages, U.S.A.

Chu, "Superconductivity," printed from http://encarta.msn.com on Sep. 24, 2001, Microsoft Encarta Online Encyclopedia, Microsoft Corporation, 4 pages, U.S.A.

"Tin," printed from http://encarta.msn.com on Sep. 24, 2001, Microsoft Encarta Online Encyclopedia, Microsoft Corporation, 4 pages, U.S.A.

Gaus, "Metals," printed from http://encarta.msn.com on Sep. 24, 2001, Microsoft Encarta Online Encyclopedia, Microsoft Corporation, 5 pages, U.S.A.

Gibbs et al., "Is Magnetic Levitation Possible?", printed from http://www.sci.kun.nl/hfml/levitation–possible.html, Mar. 18, 1997, 3 pages, The Netherlands.

\* cited by examiner

| | | C1 | C2 | C3 |
|---|---|---|---|---|
| | | First Coil | Second Coil | Third Coil |
| R1 | a1(m) | 0.0520 | 0.0350 | 0.0150 |
| R2 | a2(m) | 0.1200 | 0.0520 | 0.0350 |
| R3 | H(m) | 0.0700 | 0.0550 | 0.0500 |
| R4 | I(A) | 0.500E+03 | 0.500E+03 | 0.500E+03 |
| R5 | nt(i) | 1904.0 | 374.0 | 300.0 |
| R6 | J(A/m$^2$) | 0.200E+09 | 0.200E+09 | 0.150E+09 |
| R7 | A*m | .514E+06 | .511E+05 | .236E+05 |
| R8 | Bo | 6.677 | 2.295 | 2.682 |
| R9 | b(a1) | 7.484 | 9.879 | 12,052 |
| R10 | b(a2) | -2.450 | 7.484 | 9.789 |
| R11 | Sh(Mpa) | 64.543 | 97.355 | 68.224 |
| R12 | Itot(A) | 0.952E+06 | 0.187E+06 | 0.150E+06 |

| | C1 | C2 | C3 | C4 | C5 | C6 | C7 | C8 | C9 |
|---|---|---|---|---|---|---|---|---|---|
| R1 | Z(m) | R(m) | Br(T) | Bz(T) | Bt(T) | dBz/dr(T/m) | dBz/dz(T/m) | Fz(N/m3) | Fr(N/m3) |
| R2 | 0.0150 | 0.0000 | 0.0000 | 10.8441 | 10.8441 | 0.000 | -107.921 | -0.931E+09 | 0.322E+01 |
| R3 | 0.0150 | 0.0025 | 0.1350 | 10.8550 | 10.8558 | 8.712 | -108.154 | -0.933E+09 | 0.811E+08 |
| R4 | 0.0150 | 0.0050 | 0.2709 | 10.8879 | 10.8913 | 17.700 | -108.793 | -0.939E+09 | 0.165E+09 |
| R5 | 0.0183 | 0.0000 | 0.0000 | 10.4470 | 10.4470 | 0.000 | -129.855 | -0.108E+10 | 0.288E+01 |
| R6 | 0.0183 | 0.0025 | 0.1627 | 10.4566 | 10.4579 | 7.713 | -130.400 | -0.108E+10 | 0.726E+08 |
| R7 | 0.0183 | 0.0050 | 0.3273 | 10.4860 | 10.4911 | 15.852 | -132.001 | -0.110E+10 | 0.150E+09 |
| R8 | 0.0217 | 0.0000 | 0.0000 | 9.9827 | 9.9827 | 0.000 | -147.861 | -0.117E+10 | 0.224E+01 |
| R9 | 0.0217 | 0.0025 | 0.1854 | 9.9899 | 9.9916 | 5.758 | -148.771 | -0.118E+10 | 0.586E+08 |
| R10 | 0.0217 | 0.0050 | 0.3743 | 10.0118 | 10.0188 | 11.906 | -151.582 | -0.120E+10 | 0.118E+09 |
| R11 | 0.0250 | 0.0000 | 0.0000 | 9.4702 | 9.4702 | 0.000 | -159.543 | -0.120E+10 | 0.141E+01 |
| R12 | 0.0250 | 0.0025 | 0.2001 | 9.4739 | 9.4760 | 3.008 | -160.635 | -0.121E+10 | 0.355E+08 |
| R13 | 0.0250 | 0.0050 | 0.4044 | 9.4852 | 9.4938 | 6.030 | -164.076 | -0.124E+10 | 0.723E+08 |
| R14 | 0.0283 | 0.0000 | 0.0000 | 8.9274 | 8.9274 | 0.000 | -163.783 | -0.116E+10 | 0.602E+00 |
| R15 | 0.0283 | 0.0025 | 0.2053 | 8.9277 | 8.9300 | 0.199 | -164.710 | -0.117E+10 | 0.149E+08 |
| R16 | 0.0283 | 0.0050 | 0.4142 | 8.9281 | 8.9377 | 0.028 | -167.576 | -0.119E+10 | 0.282E+08 |
| R17 | 0.0317 | 0.0000 | 0.0000 | 8.3836 | 8.3836 | 0.000 | -161.581 | -0.108E+10 | 0.473E-01 |
| R18 | 0.0317 | 0.0025 | 0.2023 | 8.3814 | 8.3838 | -1.820 | -162.155 | -0.108E+10 | 0.946E+06 |
| R19 | 0.0317 | 0.0050 | 0.4068 | 8.3741 | 8.3840 | -4.060 | -163.847 | -0.109E+10 | -0.322E+06 |
| R20 | 0.0350 | 0.0000 | 0.0000 | 7.8568 | 7.8568 | 0.000 | -155.227 | -0.971E+9 | -0.238E+00 |
| R21 | 0.0350 | 0.0025 | 0.1942 | 7.8532 | 7.8556 | -2.898 | -155.482 | -0.972E+9 | -0.611E+07 |
| R22 | 0.0350 | 0.0050 | 0.3893 | 7.8421 | 7.8518 | -6.076 | -156.216 | -0.977E+9 | -0.137E+08 |

SUPERCONDUCTING LEVITATION MAGNET

BACKGROUND OF THE INVENTION

The present invention relates generally to superconducting levitation magnets and, more particularly, to a cost effective apparatus and method for levitating a diamagnetic material using a magnetic field produced by a superconducting magnet.

The use of a magnetic field to levitate a diamagnetic material is known in the prior art. This type of technology has been used to levitate objects such as water, frogs, golf balls, peanuts, etc. Among other things, levitation magnets can be used to study the effects of microgravity on plant or crystal growth, without traveling in space.

There are generally three types of magnets available for diamagnetic levitation: resistive magnets, superconducting magnets, and hybrid magnets (i.e., part resistive and part superconducting). The cost to produce and operate such conventional levitation magnets, however, is high. Presently available resistive magnets cost roughly a half a million dollars to produce and operate and they consume tens of megawatts of power during operation. Presently available hybrid magnets cost a few million dollars to provide very uniform levitation fields. Known superconducting magnets are a less expensive solution, but still require a capital cost of around one hundred and fifty thousand dollars and at least fairly modest operating costs. Moreover, due to their size, a person may have difficulty repositioning such magnets without assistance. Examples of such levitation applications are described in *Of Flying Frogs and Levitrons*, M. V. Berry and A. K. Geim, EUR. J. PHYS. 18 (1997), pgs. 307–313 and *Diamagnetic Levitation: Flying Frogs and Floating Magnets*, M. D. Simon and A. K. Geim, J. APPL. PHYS., Vol. 87, No. 9, 1 May 2000, pgs. 6200–6204, the entire disclosures of which are incorporated herein by reference.

As recognized by the inventors hereof, a cost effective apparatus and method that levitates diamagnetic material using a superconducting magnet that requires less material and less space, costs less, and that is more user friendly than traditional levitation magnets, is needed.

SUMMARY OF THE INVENTION

The inventors hereof have designed and developed an apparatus and method for levitating a diamagnetic material using a superconducting magnet that overcomes one or more deficiencies in the prior art. A magnet embodying aspects of the invention is smaller and less expensive to produce and operate than existing levitation magnets. In general, the magnetic fields of three concentrically positioned superconducting coils having generally parallel axes and defining a bore of the magnet combine to produce an operational magnetic field to levitate a diamagnetic material positioned inside the bore of the magnet.

In accordance with one aspect of the present invention, a superconducting magnet for levitating a diamagnetic material includes a first superconducting coil having a central axis that produces a magnetic field when energized with current. A second superconducting coil is positioned concentrically within the first coil and has a central axis generally parallel to a central axis of the first coil. The second coil also produces a magnetic field when energized with current. A third superconducting coil is positioned concentrically within the second coil and has a central axis generally parallel to the central axes of the first and second coils. The third coil produces a magnetic field when energized with current and defines a bore of the magnet. The magnetic fields of the first, second and third coils combine to produce an operational magnetic field for levitating the diamagnetic material inside said bore.

In accordance with another aspect of the present invention, a method for producing a magnetic field for levitating a diamagnetic material includes positioning a first superconducting coil concentrically around a second superconducting coil so that their axes are generally parallel. The first and second coil each produce a magnetic field when energized with current. The method further includes positioning a third superconducting coil concentrically within the second coil. The third coil has a central axis generally parallel to the central axes of the first and second coils and defines a bore. The third coil also produces a magnetic field when energized with current. The method further includes applying currents to the first, second and third coils to produce magnetic fields wherein the magnetic fields of the first, second and third coils combine to produce an operational magnetic field within the bore for levitating the diamagnetic material in the bore. Finally, the method includes positioning the diamagnetic material within the bore to levitate the diamagnetic material in the bore.

Other features and advantages of the present invention will be in part apparent and in part pointed out hereinafter.

BRIEF DESCRIPTION OF THE DRAWINGS

FIGS 1B and 1C are data tables showing coil and magnetic field data according to preferred embodiments of the invention.

Corresponding reference characters indicate corresponding parts throughout the drawings.

DETAILED DESCRIPTION OF PREFERRED EMBODIMENTS

Figure 1A:
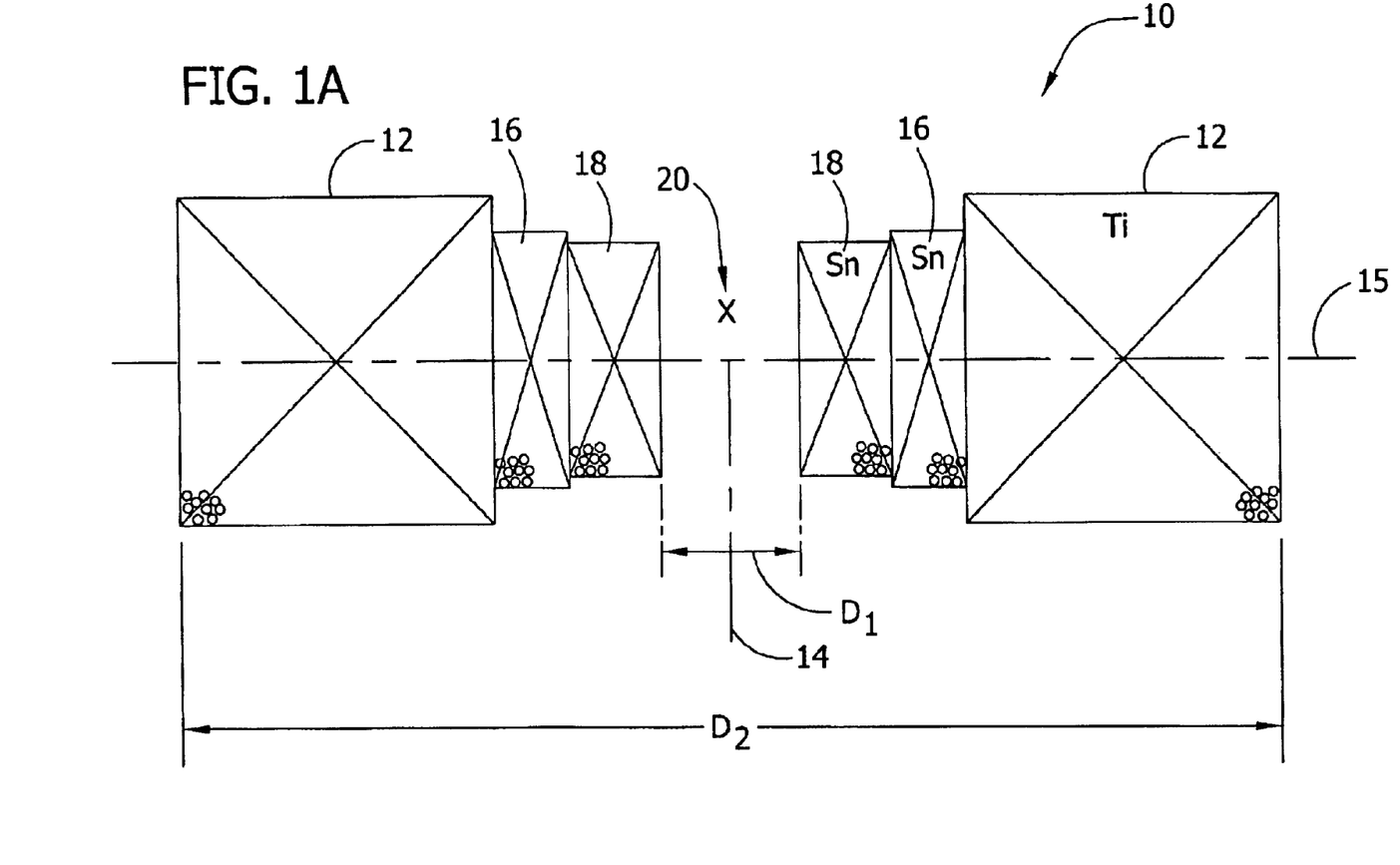
FIG. 1A illustrates an apparatus having three concentric superconducting magnetic coils according to a preferred embodiment of the invention.

Referring now to the drawings, an apparatus according to one preferred embodiment of the present invention is shown in FIG. 1A and is designated generally by reference character 10. Shown in a partial cross-sectional and view, a first superconducting coil 12 has a central axis 14, a mid-plane 15 and produces a magnetic field when energized with current. The first coil 12 preferably comprises a plurality of turns of NbTi superconducting wire. A second superconducting coil 16 is positioned within the first coil 12 and concentrically adjacent the first coil 12. A third superconducting coil 18 is positioned within the second coil 16 and concentrically adjacent the second coil 16. The third coil 18 defines a central bore 20 of the apparatus 10. The second 16 and third 18 coils each have a central axis generally parallel to the central axis 14 of the first coil 12. As shown, the central axes are substantially coincident. The second 16 and third 18 coils also each produce a magnetic field when energized with current. The second 16 and third 18 coils preferably comprise a plurality of turns of $Nb_3Sn$ superconducting wire.

In operation, a current source (not shown) energizes coils 12, 16, and 18 in a manner known to those skilled in the art to produce a magnetic field at each coil. The magnetic fields of the coils 12, 16, and 18 combine to produce an operational magnetic field inside the bore 20 of the apparatus 10 for levitating a diamagnetic material X, such as water, within the bore 20. As shown in the illustrated embodiment of FIG. 1A, the third coil 18 preferably has an inner diameter $D_1$ of approximately 30 millimeters and the first coil 12 preferably has an outer diameter $D_2$ of approximately 240 millimeters. In this embodiment, the maximum operational magnetic field is approximately 11.7 T.

Figure 1B:
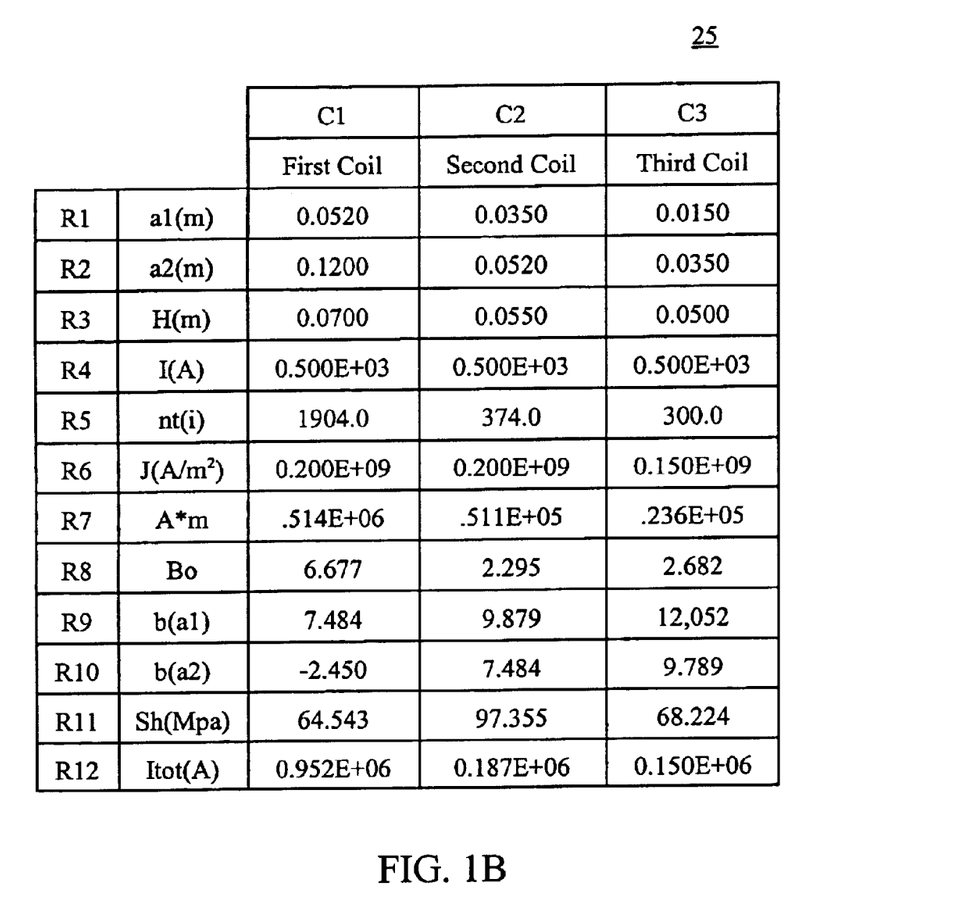

Referring now to FIG. 1B, a first data table 25 illustrates optimization parameters for each coil of apparatus 10 according to preferred embodiments of the invention. The data table 25 includes the following optimization parameters for each coil: inner radius in meters a1(m); outer radius in meters a2(m); coil height in meters H(m); wire current in amperes I(a); number of turns in coil n(t); coil current density in amps per square meter $J(A/m\hat{0}2)$; ampere meters of wire A*m; central magnetic field contribution B0 in Tesla; magnetic field at inner radius b(a1); hoop stress in megapascals Sh(MPa); and total coil current in amperes Itot(A). For example, the cell located at row R1 and column C1 in data table 25, hereinafter referred to as R1C1, provides that an optimized inner radius a1(m) of the first coil is 0.0520 meters (i.e., 52 millimeters). As another example, the cell located at R1C2 in data table 25 provides that the optimized outer radius, a2, of the first coil is 0.120 meters (i.e., 120 millimeters). Because the optimized inner and outer radii are known, the optimized inner and outer diameters for each coil are also known. For instance, the optimized inner diameter of the first coil 32 is 104 millimeters (i.e., 2*52 mm), and the outer diameter of the first coil 32 is 240 millimeters (i.e., 2*120 mm). In other words, the width of the magnet $D_2$ is equal to 240 millimeters. In this example, bore width $D_1$ is equal to 30 millimeters (i.e., 2*15 mm). Table 25 also includes the central magnetic field contribution from each coil. As shown in table 25, the first coil 12 contributes 6.677 T (see R8C1), the second coil 16 contributes 2.295 T; and the third coil 18 contributes 2.682 T (see R8C3). The total operational magnetic field (11.7 T) can be determined by summing the central magnetic field contribution of each of the coils 32, 36, 38.

Referring now to FIG. 1C, a second data table 27 illustrates exemplary magnetic field and gradient calculations obtained at various positions within the bore 20 of the magnets according to preferred embodiments of the invention. More specifically, data table 27 illustrates magnetic field and gradient calculations that will be obtained at various positions within the bore 20 relative to the central axis 14, and the mid-plane 15 of the coils of the magnet according to a preferred embodiment. Data table 27 includes the following data: position above the mid-plane of coil in meters z (m); position off the axis of the coil in meters R (m); radial field component in Tesla Br (T); axial field component in Tesla Bz (T); total field component in Tesla Bt (T); radial field derivative in Tesla per meter dBz/dr (T/m); axial field derivative in Tesla per meter dBz/dz (T/m); axial volumetric levitation force density on water in Newtons per cubic meter Fz (N/m3); and radial volumetric magnetic force density on water in Newtons per cubic meter Fr (N/m3). For example, at a position 0.0150 meters above the mid-plane 15 (see cell R1C1 in table 27) and along the central axis 14 ( i.e., 0.0 meters from the central axis 14) (see cell R1C2 in table 27) the calculated total magnetic field component (Bt (T)) is 10.8441 T (see cell R1C5 in table 27).

Figure 2:
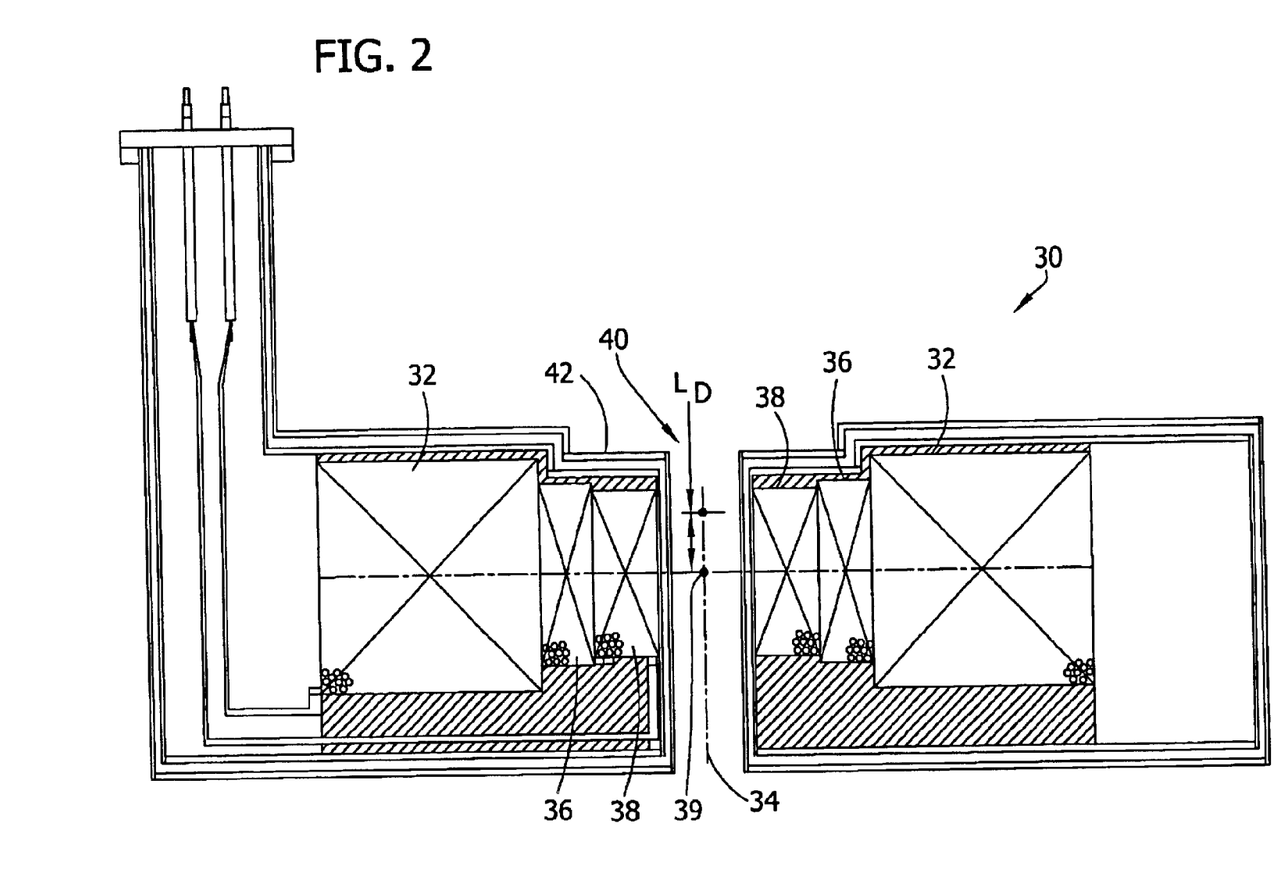
FIG. 2 illustrates an apparatus having three concentric superconducting magnetic coils according to another preferred embodiment of the invention.

An apparatus according to another preferred embodiment of the present invention is shown in FIG. 2 and is designated generally by reference character 30. Shown in a partial and cross-sectional view, a first superconducting coil 32 has a central axis 34 and a mid-plane 35 and produces a magnetic field when energized with current. A second superconducting coil 36 is positioned within the first coil 32 and concentrically adjacent the first coil 32. A third superconducting coil 38 is positioned within the second coil 36 and concentrically adjacent the second coil 36. The third coil 38 defines a central bore 40 of the apparatus 10. The central axes of second 36 and third 38 coils are generally coincident with the central axis 34 of the first coil 32, and the mid-planes of the second 36 and third 38 coils are generally coincident with the mid-plane 35. The second 36 and third 38 coils also each produce a magnetic field when energized with current. In operation, a current source (not shown) energizes the coils 32, 36, and 38 to produce a magnetic field at each coil. The magnetic fields of the coils combine to produce an operational magnetic field inside the bore 40 of the apparatus 30 for levitating a diamagnetic material, such as water, in the bore 40. Although some existing magnets have nested coils, such magnets are designed for maximum field, rather than designed to provide sufficient levitation force to levitate water and the like. Frequently, magnet designers modify high field magnets to provide levitation by inserting additional coils. This is not an efficient process. In contrast, the magnet according to the present invention is designed specifically for levitation. As a result, the final product is more efficient because it uses less material, has lower cost, is more compact, and is more user friendly than traditional levitation magnets.

Referring further to FIG. 2, the point of levitation for a diamagnetic material within an operational magnetic field produced according to the invention is shown. In FIG. 2, the apparatus is configured to produce a levitation point within the magnetic field that allows the diamagnetic material to be manipulated and/or observed through a microscope while it is levitating. The apparatus 30 preferably produces a levitation point within the bore 40 at a distance $L_D$ approximately 15 mm above a field center 39 of the magnet. In this case, the field center 39 corresponds to the intersection between the central axis 34 and a mid-plane 35. A cryostat 42 houses apparatus 30 and controls the temperature of coils 32, 36, and 38.

As described above, apparatus 10 (and apparatus 30) can be built and optimized at a cost (including operating costs) significantly lower than prior art levitation magnets because it uses less material, is more compact, and more user friendly than traditional levitation magnets. For example, the height of the largest coil of a levitation magnet according to the present invention is about 70 mm while competing systems may be several hundred millimeters tall. The lower volume of wire implies lower material, tooling, and labor costs. Moreover, the mass and volume of the diamagnetic material X that can be levitated using the apparatus 10, 30, however, is substantially smaller than that levitated by prior art levitation magnets. For example, apparatus 10, 30 can levitate a mass of material having a diameter of approximately 2 millimeters whereas the more expensive prior art levitation magnets are capable of levitating a mass of material having a diameter of 20 millimeters. The object of producing a levitation magnet at dramatically reduced costs is achieved, however, by the present invention.

Figure 3:
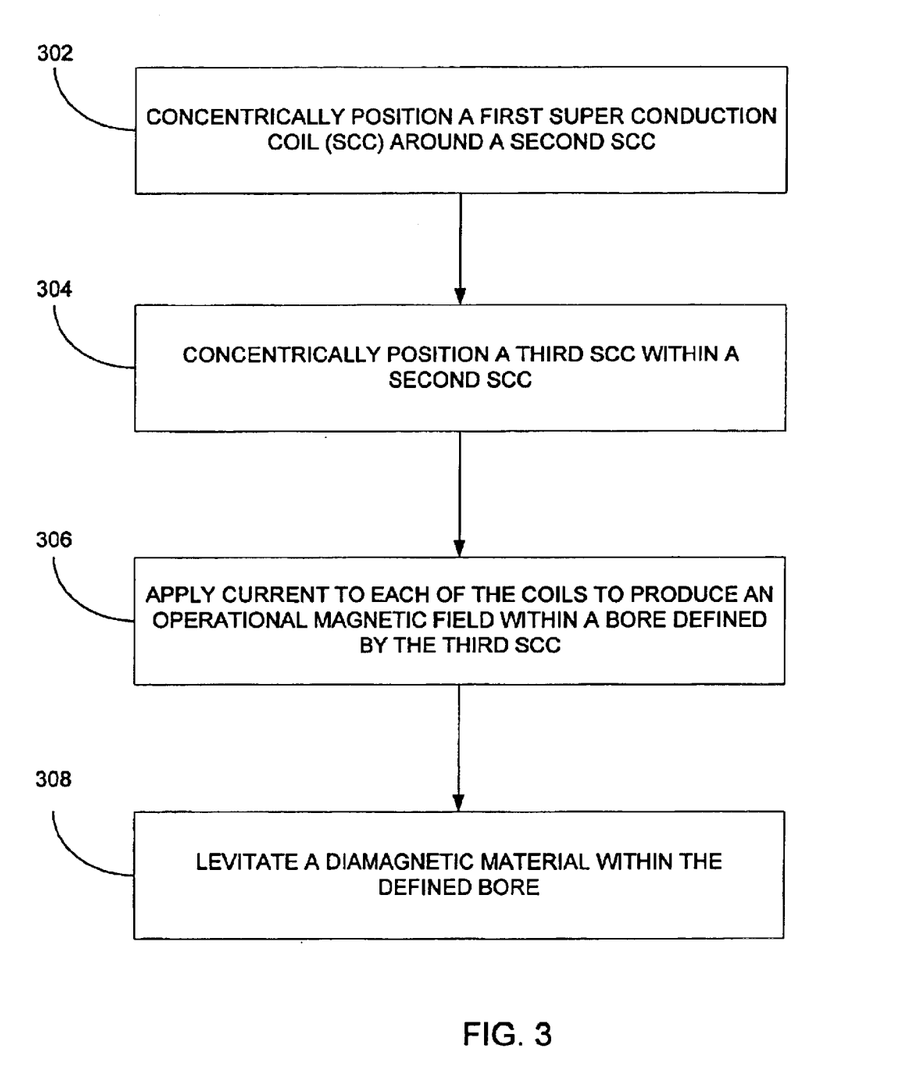
FIG. 3 is an exemplary flow chart illustrating a method for producing a magnetic field for levitating a diamagnetic material according to one preferred embodiment of the invention.

Referring now to FIG. 3, a flow chart illustrates a method for producing a magnetic field for levitating a diamagnetic material according to one preferred embodiment of the invention. At 302, a first superconducting is positioned concentrically around a second superconducting coil so that there central axes are generally parallel. A third superconducting coil is concentrically positioned within the second coil at 304. The third coil has a central axis generally parallel to the central axes of the first and second coils and defines a bore. At 306, each coil is energized with a current and each produces a magnetic field. The magnetic fields of the first, second and third coils combine to produce an operational magnetic field (e.g., 11.7 T) within the bore for levitating the diamagnetic material in the bore. A diamagnetic material such as water is positioned within the bore and levitated at 308.

The applications of use for the cost effective levitation magnet disclosed herein include using the levitation magnet to test experiments on earth prior to committing to the cost of space-based experiments on a space shuttle or space station. It can also be used to grow high purity protein crystals on earth for use in pharmaceutical development. The low cost levitation magnet would also be ideal for demonstrating magnetic levitation in science museums and schools, where the cost of prior art levitation magnets would be prohibitive.

When introducing elements of the present invention of the preferred embodiments thereof, the articles "a," "an," "the," and "said" are intended to mean that there are one or more of the elements. The terms "comprising," "including," and "having" are intended to be inclusive and meant that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An apparatus for levitating a diamagnetic material, said magnet comprising:
   a first superconducting coil having a central axis, said first coil producing a magnetic field when energized with current;
   a second superconducting coil positioned concentrically within the first coil, said second coil having a central axis generally parallel to the central axis of the first coil and producing a magnetic field when energized with current; and
   a third superconducting coil positioned concentrically within the second coil, said third coil having a central axis generally parallel to the central axes of the first and second coils and producing a magnetic field when energized with current and said third coil defining a bore of the magnet, said magnetic fields of the first, second and third coils combining to produce an operational magnetic field for levitating the diamagnetic material inside said bore.

2. The apparatus of claim 1 wherein the first superconducting coil comprises NbTi superconducting wire.

3. The apparatus of claim 1 wherein the second superconducting coil comprises $Nb_3Sn$ superconducting wire.

4. The apparatus of claim 1 wherein the third superconducting coil comprises $Nb_3Sn$ superconducting wire.

5. The apparatus of claim 1 wherein the first superconducting coil has an inner diameter of about 104 millimeters.

6. The apparatus of claim 1 wherein the second superconducting coil has an inner diameter of about 70 millimeters.

7. The apparatus of claim 1 wherein the third superconducting coil has an inner diameter of about 30 millimeters.

8. The apparatus of claim 1 wherein the first superconducting coil has an outer diameter of about 240 millimeters.

9. The apparatus of claim 1 wherein the second superconducting coil has an outer diameter of about 104 millimeters.

10. The apparatus of claim 1 wherein the third superconducting coil has an outer diameter of about 70 millimeters.

11. The apparatus of claim 1 wherein the second superconducting coil has an outer diameter less than an inner diameter of the first superconducting coil.

12. The apparatus of claim 1 wherein the third superconducting coil has an outer diameter less than an inner diameter of the second superconducting coil.

13. The apparatus of claim 1 wherein the first, second, and the third superconducting coils are each energized by applying a current of about 0.500E+03 amperes to each coil.

14. The apparatus of claim 1 wherein the maximum operational magnetic field is at least about 11.7 T.

15. The apparatus of claim 1 wherein the operational magnetic field produces a levitation point for levitating the diamagnetic material inside said bore and about 15 mm above a field center of the magnet, said field center corresponding to an intersection between the central axis and a mid-plane of the first, second, and third coils.

16. The apparatus of claim 15 wherein the operational magnetic field produces a levitation point for levitating the diamagnetic material inside said bore and between about 0 mm and about 30 mm above the field center of the magnet.

17. The apparatus of claim 15 wherein the operational magnetic field levitates a mass of diagrammatic material having a diameter of about 2 millimeters.

18. A method for producing a magnetic field for levitating a diamagnetic material, said method comprising the steps of:
   positioning a first superconducting coil having a central axis concentrically around a second superconducting coil having a central axis generally parallel to the central axis of the first coil, said first and second coils each producing a magnetic field when energized with current;
   positioning a third superconducting coil concentrically within the second coil, said third coil having a central axis generally parallel to the central axes of the first and second coils and said third coil defining a bore and producing a magnetic field when energized with current;
   applying currents to the first, second and third coils to produce magnetic fields, said magnetic fields of the first, second and third coils combining to produce an operational magnetic field within the bore for levitating the diamagnetic material in the bore; and
   positioning the diamagnetic material within the bore to levitate the diamagnetic material in the bore.

19. The method of claim 18 wherein the concentrically positioned first, second and third coils are housed in a cryostat, and wherein said cryostat controls the temperature of the first second, and third coils.

20. The method according to claim 18 wherein the diamagnetic material is levitated in the bore and 15 mm above a field center of the magnet, said field center corresponding to an intersection between the central axis and a mid-plane of the first, second, and third coils.

21. The method according to claim 18 wherein the diamagnetic material is levitated in the bore and between about 0 mm and about 30 mm above the field center of the magnet.

22. A superconducting magnet for levitating a diamagnetic material, said magnet comprising:

a first superconducting coil having a central axis, said first coil producing a magnetic field when energized with current;

a second superconducting coil positioned concentrically within the first coil, said second coil having a central axis generally parallel to the central axis of the first coil and producing a magnetic field when energized with current;

a third superconducting coil positioned concentrically within the second coil, said third coil having a central axis generally parallel to the central axes of the first and second coils and producing a magnetic field when energized with current and said third coil defining a bore of the magnet, said magnetic fields of the first, second and third coils combining to produce an operational magnetic field for levitating the diamagnetic material inside said bore;

a cryostat for housing the concentrically positioned first, second, and third coils, and for controlling the temperature of the first second, and third coils.

* * * * *

UNITED STATES PATENT AND TRADEMARK OFFICE
CERTIFICATE OF CORRECTION

PATENT NO. : 6,850,137 B2
DATED : February 1, 2005
INVENTOR(S) : Mark D. Bird et al.

It is certified that error appears in the above-identified patent and that said Letters Patent is hereby corrected as shown below:

Column 1,
Line 3, after the title please insert the following paragraph:
-- This invention was made with Government support under Grant No. 952705 awarded by the National Science Foundation. The Government has certain rights in the invention. --.

Column 6,
Line 57, "first second, and third" should read -- first, second, and third --.

Column 8,
Line 9, "first second, and third" should read -- first, second, and third --.

Signed and Sealed this

Thirty-first Day of May, 2005

JON W. DUDAS
*Director of the United States Patent and Trademark Office*